No. 738,559. PATENTED SEPT. 8, 1903.
J. W. MEIJER.
MOTOR BICYCLE.
APPLICATION FILED JAN. 10, 1903.
NO MODEL.
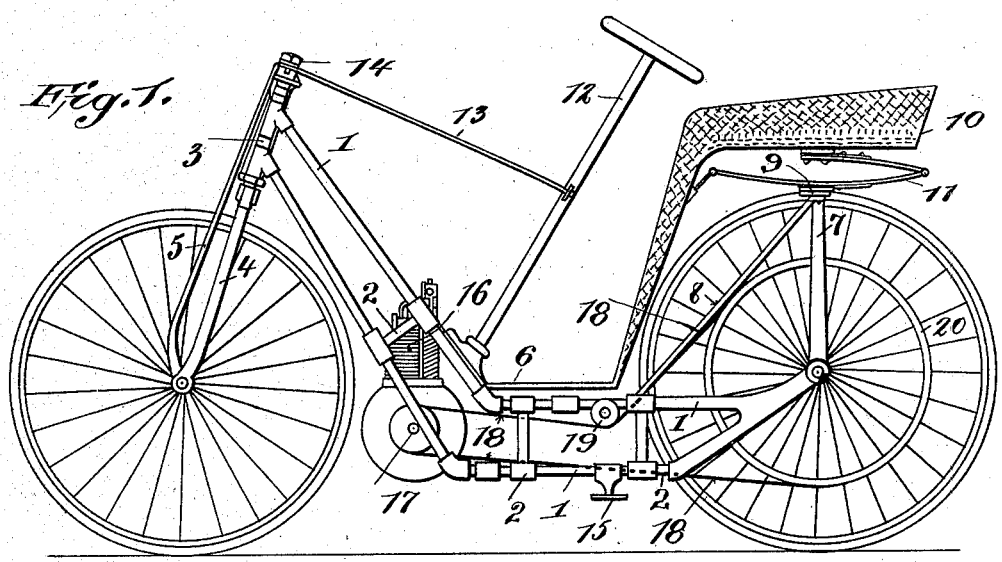
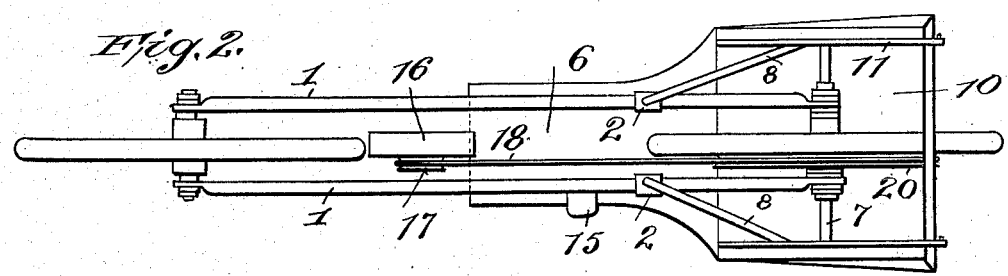
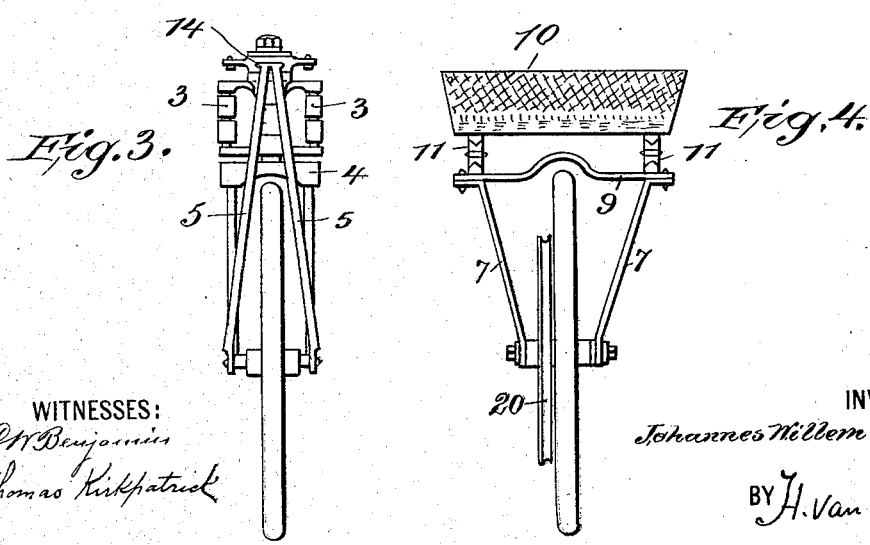
WITNESSES:
INVENTOR
Johannes Willem Meijer,
BY H. Van Oldenneel
ATTORNEY No. 738,559. Patented September 8, 1903.

UNITED STATES PATENT OFFICE.

JOHANNES WILLEM MEIJER, OF VELP, NETHERLANDS.

MOTOR-BICYCLE.

SPECIFICATION forming part of Letters Patent No. 738,559, dated September 8, 1903.

Application filed January 10, 1903. Serial No. 138,534. (No model.)

*To all whom it may concern:*

Be it known that I, JOHANNES WILLEM MEIJER, a subject of the Queen of the Netherlands, residing at Velp, Holland, have invented certain new and useful Improvements in Motor-Bicycles, of which the following is a specification.

This invention relates to an automobile bicycle—i. e., an automobile on two wheels—and is characterized by the arrangement of the frame in such a manner that by the connection or combination of two flat frames of approximately the U shape usual for ladies' bicycles there is formed an extended quadrangle, within which is arranged the driving-motor with all its parts and accessories, together with the transmission-gearing.

My improved automobile bicycle is distinguished from the known so-called "motor-safeties" in that it contains no pedal, no cranks, no transmission-chain, no handle-bar or cycle steering, and no cycle-saddle.

Over the rear wheel is arranged a convenient seat on springs and on tube-framing. The steering-gear is similar to that of an automobile. The connection of the steering-rod with the head of the front-wheel fork is, however, made at a convenient position—for example, about half-way up the said steering-rod. The rear-wheel fork of the usual cycles is dispensed with and that of the front wheel is stiffened by two stays or struts.

The automobile bicycle is shown in the accompanying drawings, in which—

Figure 1 is a side elevation; Fig. 2, a plan; Fig. 3, a front elevation, and Fig. 4 a rear elevation thereof.

The two flat frames 1 1 are made in the form of double frames and are strengthened at suitable places by means of transverse connections or stays 2. At the front end the two stays of each frame are connected to a quadrangle 3 of tubes or rods, in which the front-wheel fork 4 is rotatably arranged in the usual manner, this fork being stiffened by means of two stays or struts 5. At the lowermost point of the bend the two stays of the frame 1 are arranged horizontally. On the upper stays is mounted the footboard 6, while the lower stays behind the rear transverse stay 2 extend upward and are then connected with the upper stays to receive the axle of the rear wheel. From this point, as well as from the upper stay directly behind the footboard 6, stays 7 and 8 extend upward, which stays are connected to a transverse stay 9, bent over the rear wheel. On this transverse stay is mounted the seat 10 by means of carriage-springs 11.

The steering-rod 12 is supported on the upwardly-extended part of the footboard and is provided in the usual manner with a hand-wheel. At a convenient position on this rod 12 are attached the two steering-rods 13, which make the connection with the head 14 of the front-wheel fork 4. A step 15 facilitates mounting and is used by the rider until the motor or automobile bicycle has attained sufficient speed. The driving-motor 16 is arranged directly in front of the footboard 6 between the two frames 1 and is secured thereto in a suitable manner. From the small band or belt pulley 17 the upper limb of the transmission-band 18 extends beneath a tension-roller or jockey-pulley 19, and from that over the large band or belt pulley 20 on the rear wheel. The lower limb of the band 18 extends straight back to the small band-pulley 17. All these parts, as well as the further accessories of the motor, lie within the quadrangle formed by the two frames 1 1. The tension-roller 19 is actuated from the seat 10 through levers. By drawing up the tension-roller 19 the band 18 can be released in the usual way.

The motor is started by means of a hand-lever, whereupon the cycle is pushed forward while the rider stands with one foot on the step. In this position the tension-roller 19 is then pressed down, whereby the motion of the motor is transmitted by the band 18 to the rear wheel. As soon as the cycle has attained sufficient speed the rider can sit down. The rider can also steer the cycle very well standing on the step.

The automobile bicycle made according to this invention can be steered as easily as an ordinary bicycle, while the rider can sit thereon as comfortably as in an automobile.

What I claim is—

1. In a motor-bicycle, the combination of a frame made up of two sides, each of which sides is made up of two bars or members joined together, the said side frames being parallel throughout their extent, a quadrangular frame extending transversely between the front ends of the side frames, a front-wheel fork pivotally mounted in the said quadrangular frame, a piece extending transversely between the rear ends of the side frames, a seat supported upon said transverse piece, wheels journaled respectively in the front fork and the rear part of the frame, a motor arranged between the side frames and driving connections from the said motor to the rear wheel, substantially as described.

2. In combination, the two side frames extending parallel with each other throughout their extent from front to rear, a quadrangular frame connecting the front ends of the side frames, a transverse piece connecting the rear ends of the side frames, a steering-post pivoted in the quadrangular frame, a seat supported on the transverse piece, a motor arranged between the parallel side frames, wheels journaled respectively in the front fork and the rear part of the side frames, and driving connections from the motor to the rear wheel, substantially as described.

3. In combination, the two side frames parallel throughout their extent and of U shape, a quadrangular frame between the front ends of the parallel side frames, a front fork pivoted in said quadrangular frame, a wheel journaled in said front fork, struts 5 for stiffening the front fork, upwardly-extending stays 7 at the rear of the side frames, a transverse piece 9 supported on said stays, a seat supported on the transverse piece and a wheel journaled in the rear part of the frame, substantially as described.

In testimony whereof I have hereunto set my hand in presence of two subscribing witnesses.

JOHANNES WILLEM MEIJER.

Witnesses:
THOMAS HERMANUS VERHAVE,
AUGUST SIEGFRIED DOCEN.